United States Patent [19]
Phillips
[11] 3,781,490
[45] Dec. 25, 1973

[54] WEB TENSION AND SPEED CONTROL IN A REEL-TO-REEL WEB TRANSPORT

[75] Inventor: William B. Phillips, Boulder, Colo.

[73] Assignee: International Business Machines Corporation, Armonk, N.Y.

[22] Filed: June 1, 1973

[21] Appl. No.: 365,891

Related U.S. Application Data

[63] Continuation-in-part of Ser. No. 198,925, Nov. 15, 1971, abandoned.

[52] U.S. Cl. .......... 179/100.2 S, 242/75.5, 242/189
[51] Int. Cl. .......... G11b 19/28
[58] Field of Search .......... 226/30, 38; 242/54.1, 189, 203, 56.9, 75.5; 179/100.2 S

[56] References Cited

UNITED STATES PATENTS

| | | | |
|---|---|---|---|
| 3,435,442 | 3/1969 | Ma et al. | 340/174.1 |
| 3,587,071 | 6/1971 | Stegman | 340/174.1 |
| 3,327,916 | 6/1967 | Weinenhammer et al. | 340/174.1 |
| 3,418,434 | 12/1968 | Groenewegen | 340/174.1 |
| 2,989,690 | 6/1961 | Cook | 340/174.1 |

*Primary Examiner*—Vincent P. Canney
*Attorney*—Francis A. Sirr et al.

[57] ABSTRACT

A reel-to-reel magnetic tape transport for a relatively wide tape which carries a number of laterally spaced data track groups and prerecorded reference tracks. Control transducer means senses the reference tracks and provides an output signal indicative of increments of tape movement. This information is used to derive an output signal indicative of the tape speed, i.e., displacement per unit time. The control transducer means also provides a signal indicative of the lateral position of the tape. The control transducer means includes a tension transducer which provides an output signal indicative of the tape tension. The lateral tape position signal controls the lateral position of a data processing head. The tape speed signal and tape tension signal jointly control the two reel drive motors to maintain a desired tape speed, i.e., a desired incremental tape distance per unit time, and a desired tape tension.

7 Claims, 8 Drawing Figures

WEB TENSION AND SPEED CONTROL IN A REEL-TO-REEL WEB TRANSPORT

RELATED APPLICATIONS

The present application is a continuation-in-part of application Ser. No. 198,925, filed on Nov. 15, 1971 and now abandoned.

The present application is related to the co-pending, commonly assigned, application of John P. Mantey, Ser. No. 267,301, filed June 29, 1972. This co-pending application is directed to a reel-to-reel web transport wherein servo reference signals for tape acceleration/deceleration, speed and position are derived by means of successive integration of a characterized start/stop command pulse.

BACKGROUND AND SUMMARY OF THE INVENTION

This invention pertains to the general field of winding and reeling, and more specifically to the field of the reeling and unreeling of web-like material which carries machine-convertible information, and to the simultaneous control of plural reel drives thereof.

This web-like material may be magnetic tape whose discrete states of magnetization in localized areas are the machine-convertible information or digital data. Transports for magnetic tape can be broadly characterized as buffered or unbuffered. The present invention relates to the latter type and particularly to a transport which is further characterized by the term reel-to-reel. In a reel-to-reel transport, a relatively short length of unbuffered magnetic tape extends between a supply reel and a take-up reel. This length of tape cooperates with a tape processing station, which may include various means, such as a read head, a write head, an erase head, a tape cleaner, and a BOT/EOT assembly. The speed and the tension of the tape as it passes through the tape processing station must be accurately controlled, and in most applications must be maintained piecewise-constant, i.e., constant over an interval. This is done by controlling the two reel motors.

The prior art discloses apparatus which provides two tape tension sensors, one on each side of the tape processing station. Each sensor controls that reel motor which is on its side of the processing station. The tension sensing transducers may be mechanical devices, as by having movable tension arms engage the tape with rollers, or they may be nonmechanical devices, as by having the tape pass over air bearings and then sensing the pressure at the tape-bearing interface as an indication of tape tension.

The prior art also provides a pivoted link which supports a roller on each side of the processing station, such that the link assumes an angular position in accordance with a comparison of the tape tension on the two sides of the processing station. The variable link position is then used to differentially control the two reel motors in a manner to maintain the sum of these two tensions constant.

Other prior art discloses a two-capstan tape transport wherein the speed of the take-up capstan is controlled from a head which senses a prerecorded reference track carried by the tape, and the supply capstan is controlled from a tape tension transducer which senses the tape tension at a point between the supply capstan and the head. Also, prior art discloses the use of a number of such prerecorded reference tracks, of different frequencies, to control the lateral position of a data processing head, causing the head to laterally follow any undesired lateral tape movement which may occur.

Still other prior art discloses a reel-to-reel device in which a tape speed tachometer controls one or both reel motors and a tape tension transducer controls the other reel motor.

The present invention seeks to control in an optimum manner certain critical physical phenomena which exist at the head-to-tape interface of a magnetic tape unit. These physical phenomena are the speed of the tape relative to the head, the increment of movement of the tape between bytes of data, the spacing between the tape and the head (also called "flying height"), the lateral position or shift of the tape relative to the head, and the tension in the tape. All of these phenomena affect, in one way or another, the dynamic process by which machine-convertible information, for example bytes of digital data, is transferred between the head and the tape in the read and the write modes. Certain of these phenomena are closely interrelated. For example, tape speed has the dimensions of incremental movement per unit of time. Also, the flying height is known to vary with both tape speed and tape tension.

As used herein, the term speed is intended to mean the scaler magnitude of the tape-to-head relative velocity parameter. Velocity is the distance moved per unit time, or speed, in a specified direction. As will be apparent, magnetic tape passes a transducer or head in intimate contact to produce a tape wrap about the head, perhaps with a thin air-film separation. Since the tape changes direction as it passes over the head, its direction parameter and hence velocity change; however, its speed is controlled to remain piecewise constant.

Also, as used herein, the term tension is intended to mean the degree of being stretched to stiffness, i.e., either of two balancing forces causing or tending to cause extension of the length of tape running between the two reels.

The term acceleration, as used herein, generically encompasses both increasing speed and decreasing speed. Normally, a decreasing speed is called deceleration.

The present invention provides control transducer means to measure at least certain of these phenomena. These measurements are utilized to jointly control both reel motors to maintain the phenomena at desired values. Ideally, these measurements are made directly at the tape-to-head interface. However, it is contemplated that measurements can be made at other physical locations, and that these measurements can then be manipulated or interpreted so as to provide an eventual measurement which is an accurate analogy to the phenomena at the tape-to-head interface. In the preferred embodiment of the present invention, tape speed and tape tension at or immediately adjacent the tape-to-head interface are measured.

The preferred embodiment of the present invention discloses a reel-to-reel web transport wherein both the supply reel motor and the take-up reel motor are jointly controlled in accordance with both the measurement of actual-tape-speed and actual-tape-tension by control transducer means which cooperates with the length of unbuffered tape traveling between the two reels. By means of this joint control, the apparatus of the present invention quickly adjusts one or both of the speed and tension variables.

The mass of the tape running between the reels is relatively low, and both its spring constant and its damping factor are relatively high. Thus, uniformly accelerating the total mass of the tape running between the reels changes the tape speed without appreciably changing the tape tension. Also, by instituting a momentary accelerate-decelerate interval of at least one reel, the tension in this unbuffered length of tape can be changed without changing the tape speed which exists before and after that interval. Joint energization control of both reels changes both speed and tension in this unbuffered length of tape.

More specifically, the web transport of the present invention utilizes a relatively wide tape which includes a prerecorded reference track of a known linear characteristic, such as pulses recorded on tape at fixed distance intervals. A control magnetic head cooperates with this reference track and provides an output pulse for each incremental tape distance measurement. The repetition rate of these pulses is related to a time factor to provide an actual-tape-speed output signal. This head also includes a tension sensing transducer which provides an actual-tape-tension output signal. These two signals are connected to a control network which references them to a four-quadrant cartesian coordinate system and derives a servomechanism control order for the two reel motors. The control order implemented by this control network defines the manner in which the two motors are jointly controlled as these two signals vary. Specifically, this control order (control quadrant 1) changes the relative energization of the reel motors when the tape is overspeed and the tension is high such that the delta energization of the take-up motor, i.e., the change in energization, minus and plus the delta energization of the supply motor in both cases is less than zero; (control quadrant 3) changes the relative energization of the reel motors when the tape is underspeed and the tension is low such that the delta energization of the take-up motor minus and plus the delta energization of the supply motor in both cases is greater than zero; (control quadrant 2) changes the relative energization of the reel motors when the tape is underspeed and the tension is high such that the delta energization of the take-up motor minus and plus the delta energization of the supply motor is less than zero and greater than zero, respectively; and (control quadrant 4) changes the relative energization of the reel motors when the tape is overspeed and the tension is low such that the delta energization of the take-up motor minus and plus the delta energization of the supply motor is greater than zero and less than zero, respectively. The control of these two motors is such as to restore the tape speed and the tape tension to a desired value. For example, when the tape is underspeed and the tape tension is low (quadrant 3), the total mass of the moving length of unbuffered tape must be accelerated in the forward direction, i.e., the delta energization of the take-up motor plus the delta energization of the supply motor must be greater than zero. This adjusts the tape speed to a desired higher value. However, this alone does not necessarily adjust the tension to the higher proper value. In order to adjust tension, the forward torque supplied by the take-up reel motor and the backward torque supplied by the supply reel motor must be increased, to increase the tape tension, i.e., the delta energization of the take-up motor minus the delta energization of the supply motor must be greater than zero.

As a further feature of the present invention, the tape includes a number of laterally positioned groups of digital data tracks. A data processing head is adapted to selectively operate with a selected one of these groups of data tracks. The above-mentioned control head, which cooperates with the reference tracks, additionally provides an actual-lateral-tape-position signal which is used to servo-position a head actuator to laterally position the data processing head if the tape experiences undesirable lateral movement or shift.

The foregoing and other features and advantages of the invention will be apparent from the following more particular description of the preferred embodiments of the invention, as illustrated in the accompanying drawing.

DESCRIPTION OF THE PREFERRED EMBODIMENT

Figure 1:
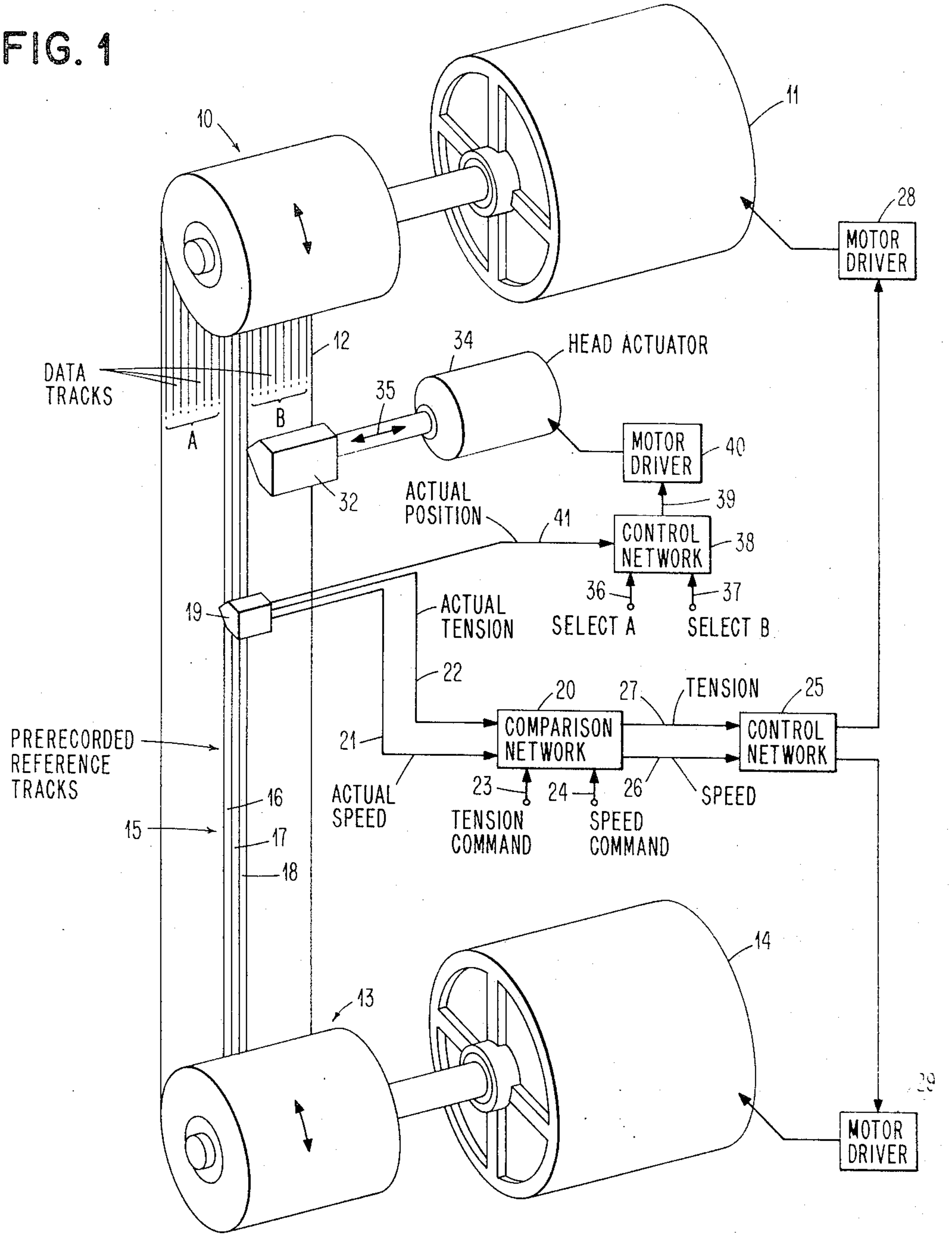
FIG. 1 is a diagrammatic showing of a web transport incorporating the present invention, this embodiment having a control transducer means in the form of a stationary control magnetic head, and having an indexing data processing magnetic head.

Referring to FIG. 1, the web transport diagrammatically disclosed therein is a simplified reel-to-reel transport which facilitates an explanation and an understanding of the present invention. Many of the structural details of such a web transport have been eliminated to simplify the disclosure. For example, various support and guidance devices are not disclosed. Furthermore, details of the supply reel or cartridge, the manner of threading the end of the tape from the supply reel to the take-up reel, and the means of attaching the end of the tape to the take-up reel, as by means of a vacuum, have not been disclosed. The following description of the present invention, and of the manner and process of making and using the same is in such full, clear, concise and exact terms as to enable any person skilled in the art to which the present invention pertains, or with which it is most nearly connected, to make and use the same, without a detailed disclosure of the various devices of this type which most likely would be used in the commercial embodiment of a web transport incorporating the teachings of the present invention.

In FIG. 1 the supply reel is designated generally by reference numeral 10. This supply reel is bidirectionally driven by supply reel motor 11. The supply reel carries a relatively wide web in the form of magnetic tape 12. A length of unbuffered tape extends between the supply reel and take-up reel 13. The take-up reel is connected to be bidirectionally driven by take-up motor 14.

By way of example, the lateral width of tape 12 may be approximately four inches. Because of its width, the tape can carry a plurality of laterally positioned groups of digital data tracks, two of which are identified by the legends A and B. Intermediate these groups of data tracks are prerecorded reference tracks 15 of known linear characteristic. By way of example, reference tracks 15 may include three tracks 16, 17 and 18, all of which have a prerecorded digital signal of different but constant repetition rates or frequencies, i.e., recorded on tape at fixed distance increments.

Control transducer means in the form of a magnetic transducing head 19 is mounted at a fixed linear and transverse position and cooperates with the length of unbuffered tape. This control transducer means includes a magnetic head which reads reference tracks 15 and provides a cyclic output signal whose time repetition rate is an actual-tape-speed signal. This signal is applied to comparison network 20 by way of conductor 21.

While this method of measuring tape speed is preferred, it is recognized that other means, such as a tape driven tachometer can be used to derive a signal representative of the tape speed at the critical tape interface, and that such other means is then equivalent to transducer means 19.

Included within transducer means 19 is a tension transducer which provides an actual-tape-tension signal to comparison network 20 by way of conductor 22. The details of the construction of the tension transducer means have not been disclosed. The present invention contemplates that this transducer can be implemented by a variety of force transducer means shown in the prior art, for example, a magnetic head which includes a mechanical feeler, or a pressure responsive air jet or bearing, or a load cell type transducer. The unbuffered length of tape tautly running between reels 10 and 13 passes transducer means 19 in intimate contact, so as to produce a tape wrap about the transducer means. As a result, the transducer means experiences a force component which is generally normal to the direction of tape motion. The magnitude of this force component is directly related to the magnitude of the tape's tension. Thus, for example, transducer means 19 may include a load cell type transducer which is used to detect and to measure the magnitude of this force component and provide as an output the actual-tape-tension signal on conductor 22.

Control transducer means 19 is shown linearly displaced from a data processing head 32. As has been mentioned, the critical tape-to-head interface exists at head 32. Control transducer means 19 is ideally located at this interface, as it is in the embodiment of FIG. 2. The structure of FIG. 1 exaggerates the displacement of transducer means 19 and head 32 in order to facilitate an understanding of the fact that the output signals 21, 22 and 41 (to be described) can be manipulated and interpreted to accurately indicate the desired physical phenomena at the tape-to-head interface of head 32. In its broader aspect, transducer means 19 is to be considered as a transducer means which measures both the tape speed and the tape tension at the tape-to-head interface of the data processing head 32.

Comparison network 20 also receives as inputs a tension command signal on conductor 23 and a speed command signal on conductor 24. These two command signals indicate the desired tape tension and the desired tape speed at the location of head 32. These commands may be steady-state, as is usual when a block of data is being written or read by head 32, or these commands may be a programmed variable, or piecewise-constant, as when the tape is starting or stopping in an interblock gap between blocks of data at head 32.

Comparison network 20 may take many forms, as known to those or ordinary skill in the art. Comparison network 20 compares the tension command with the actual tension to provide an error output indicating that the tension is high, low or equal to the desired value. Also, comparison network 20 compares the speed command with the actual speed and originates an error output indicating that the speed is overspeed, underspeed or equal to the desired value.

The speed and tension outputs of comparison network 20 are supplied to the input of control network 25 by way of conductors 26 and 27, respectively. Control network 25 also may take many forms, as apparent to those of ordinary skill in the art. Control network 25 jointly controls motors 11 and 14 by way of motor drivers 28 and 29, respectively. The servomechanism control order which is accomplished by control network 25, as explained hereafter, is shown in the four-quadrant cartesian coordinate tape speed versus tape tension control order diagram of FIG. 4.

Figure 3:
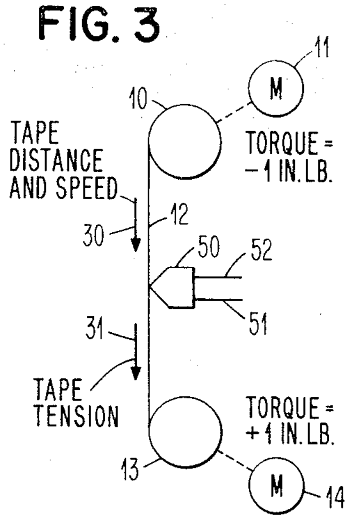
FIG. 3 is an exemplary showing of an operating state of a web transport and aids in understanding the present invention.

FIG. 3 is an exemplary showing of a portion of a web transport which provides a typical operating condition of the present invention. In this figure, motors 11 and 14 are shown connected to reels 10 and 13, respectively, and a length of unbuffered tape 12 extends between these two reels. The portion of the tape at the tape-head-interface, immediate adjacent head 50, is moving in a direction represented by arrow 30. This length of unbuffered tape is penetrated by head 50, so as to produce the well known tape wrap about head 50. The tension in this portion of the tape, represented by arrow 31, exerts a force against head 50.

These two tape parameters, speed and tension, also contain tape-to-head flying height information since flying height varies with these parameters. The physical phenomenon represented by arrows 30 and 31 is transduced by head 50 to originate an actual-tape-speed signal on conductor 51 and an actual-tape-tension signal on conductor 52. These conductors connect to control network 25 (FIG. 1), in the manner of conductors 21 and 22. Network 25 in turn controls motors 11 and 14. In the example shown, motor 11 is controlled to produce a backward force or torque of −1 inch pounds as the tape leaves reel 10. Motor 14 is controlled to produce a forward force or torque of +1 inch pounds as the tape enters reel 13. These particular torque values produce a tape tension condition at head 50 which is equal to the tension command provided at conductor 23 (FIG. 1). Rotation of the two motors produces a tape speed condition at head 50 which is equal to the speed command provided at conductor 24 (FIG. 1). Should the magnitude of tape tension and/or speed deviate from the desired value, the tension and/or speed condition, or operating point, leaves the origin of the FIG. 4 coordinate system.

Figure 5:
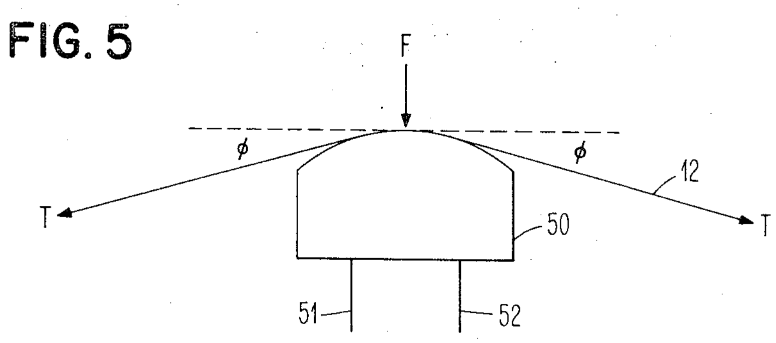
FIG. 5 is a showing of the tape-to-head interface of FIG. 3, showing the tape wrapped about the head, and is useful in understanding the manner in which tape tension is sensed.

FIG. 5 is an enlarged view of the tape-to-head interface of FIG. 3, showing the wrap of tape 12 about head 50. Tape tension force extends along the tape, as represented by the legend T. This tape tension exerts a force F on head 50, the magnitude of this force being related to the magnitude of the tape tension T and the angle $\phi$. Since the angle $\phi$ is a constant established by the tape path components, such as guides and bearings, any variation in tape tension produces a measurable variation in the magnitude of force F.

Figure 4:
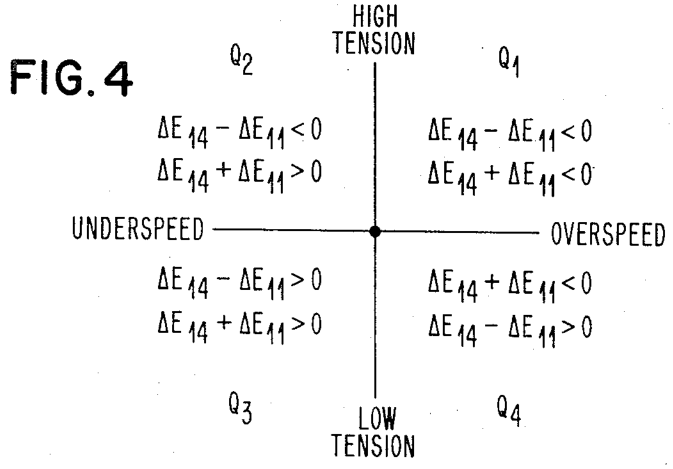
FIG. 4 is a four-quadrant cartesian coordinate tape speed versus tape tension servomechanism control order for the two reel motors which is implemented by the control network of FIG. 1.

Referring to FIG. 4, the four quadrants of this coordinate system are designated Q1, Q2, Q3 and Q4. The legends provided in FIG. 4 disclose the basic modes of operation of control network 25, whatever the exact algorithm selected by one of ordinary skill in the art to achieve any given control of motors 11 and 14. FIG. 4 is to be considered in conjunction with FIGS. 3 and 9 wherein the tape is moving from reel 10 to reel 13. In this arrangement, the differential in forward torque (motor 14) and backward torque (motor 11) establishes tape tension. The rotational speed of these two motors determines tape speed.

By way of explanation of FIG. 4, when the tape speed and tape tension at transducer 50 lies in the first quadrant of this coordinate system, the tension of the tape at transducer 50 is high and the tape is overspeed. In this case, control network 25 (FIG. 1) controls motors 11 and 14 to change the relative energization of these motors. The change in energization of motors 11 and 14 is proportioned between the two motors to reduce tape tension. This change in energization also causes the mass of unbuffered tape traveling between the two reels 10 and 13 to experience a net deceleration, thus reducing tape speed. Likewise, when transducer 50 experiences low tape tension and an underspeed condition, control network 25 orders the third quadrant control of motors 11 and 14, namely the change in energization of motor 14, plus and minus the change in energization of motor 11, must in both cases be greater than zero. When the required control order is in the second quadrant, the tape tension is high and the tape is underspeed, and the relative energization of the motors is changed as shown in FIG. 4. When the control order for these motors is in the fourth quadrant, the tension is low and the tape is overspeed, the change in energization is such that the delta energization of motor 14 plus the delta energization of motor 11 is less than zero, whereas the delta energization of motor 14 plus the delta energization of motor 11 is greater than zero.

Figure 8:
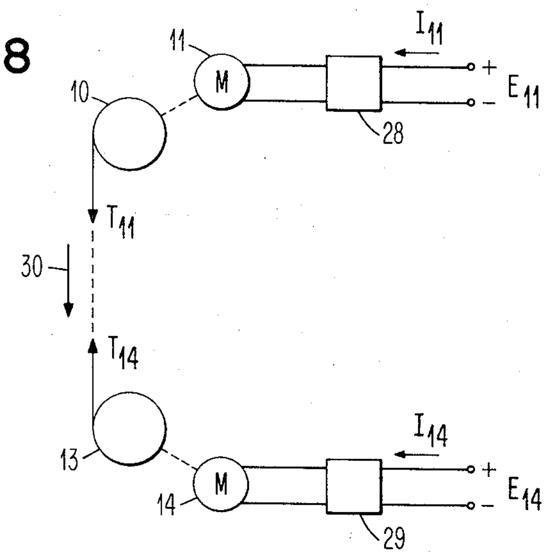
FIG. 8 is a figure similar to FIG. 3 which is used to develop the motor equations which support the control order of FIG. 4.

FIG. 8 is a figure similar to FIG. 3 which is useful in developing the control order of FIG. 4 and in explaining the control phenomenon of the present invention. Assuming that motors 11 and 14 have identical characteristics, a first set of motor equations can be expressed as $E_{14}=I_{14}R+K_e\omega_{14}$ and $E_{11}=I_{11}R+K_e\omega_{11}$; where R is the motor's armature resistance, $K_e$ is the motor's voltage constant, $\omega$ is the angular velocity of the respective motor, and I is the current flowing through the respective motor.

A second set of motor equations can be expressed as $J\dot{\omega}_{14}=K_TI_{14}-L-T_{14}$, and $J\dot{\omega}_{11}=K_TI_{11}-L+T_{11}$; where $\dot{\omega}$ is the angular acceleration of the respective motor, $K_T$ is the motor's torque constant, L is the total motor losses (assumed constant for simplicity), T is the respective tape tension, noting that $T_{14}$ opposes rotation of motor 14 whereas $T_{11}$ aids rotation of motor 11.

Under steady state conditions, with the tape moving in direction 30 at a steady state speed, the angular acceleration of motors 11 and 14 ($\dot{\omega}_{11}$ and $\dot{\omega}_{14}$, respectively) are both equal to zero. Also, $T_{11}$ is equal to $T_{14}$ and equal to the tension in the length of tape running between the two reels.

Assume now that $\omega_{11}$ and $\omega_{14}$ are equal, as they would be for equal radii of tape on reels 10 and 13, then the tape's speed is proportional to and can be represented by $\omega$, which is equal to $\omega_{11}$ and $\omega_{14}$.

The two above-noted motor equations, under the assumed steady state conditions, can now be solved to show that the energization of motors 11 and 14, that is, $E_{11}$ and $E_{14}$ of FIG. 8, are expressed as $$E_{14}=(R/K_T)(L+T)+K_e\omega$$

$$E_{11}=(R/K_T)(L-T)+K_e\omega$$

Now assume that a perturbation occurs in one or both of the tape speed $\omega$ or the tape tension T, i.e., tape tension changes to $T\pm\Delta T$ and tape speed changes to $\omega\pm\Delta\omega$.

In response to these perturbations, $E_{11}$ and $E_{14}$ must change by a delta amount; i.e., the energization of motor 11 becomes $E_{11}\pm\Delta E_{11}$ and the energization of motor 14 becomes $E_{14}\pm\Delta E_{14}$.

The magnitude of $\Delta E_{11}$ and $\Delta E_{14}$ can be calculated by again referring to the motor equations. As a result, these delta magnitudes are shown to be $$\Delta E_{14}=(R/K_T)\Delta T+K_e\Delta\omega$$

$$\Delta E_{11}=(R/K_T)\Delta T+K_e\Delta\omega$$

Solving for $\Delta T$ and $\Delta\omega$, the tension and speed control terms respectively, yields $$\Delta T=(KT/R)[\Delta E_{14}-\Delta E_{11}]$$

$$\Delta\omega=(1/K_e)[\Delta E_{14}+\Delta E_{11}]$$

Referring now to FIG. 4, the first quadrant state is that of a speed/tension perturbation which has caused a high tension/overspeed condition to exist. In order to correct this condition $\Delta T$ resulting from the $\Delta E_{14}$ and $\Delta E_{11}$ must be less than zero and likewise the resulting $\Delta\omega$ must be less than zero, i.e., $\Delta E_{14}-\Delta E_{11}<$ and $\Delta E_{14}+\Delta E_{11}<0$.

For the second quadrant state, that is high tension and underspeed, $\Delta T$ must be less than zero; however, $\Delta\omega$ must be greater than zero, i.e., $\Delta E_{14}-\Delta E_{11}<0$ and $\Delta E_{14}+\Delta E_{11}>0$.

The third quadrant state, low tension and underspeed, requires that both $\Delta T$ and $\Delta\omega$ be greater than zero, i.e., $\Delta E_{14}-\Delta E_{11}>0$ and $\Delta E_{14}+\Delta E_{11}>0$.

The fourth quadrant state, low tension and overspeed, requires that $\Delta T$ be greater than zero and that $\Delta\omega$ be less than zero, i.e., $\Delta E_{14}-\Delta E_{11}>0$ and $\Delta E_{14}+\Delta E_{11}<0$.

The object of the present invention is to jointly control motors 11 and 14 so as to maintain the tape speed and the tape tension substantially constant. Rigorous application of physical principles shows that speed and tension control as achieved by the present invention may in fact produce tension transients. However, the parameters of the system, such as tape mass, tape spring constant and tape damping factor, are such that these transients are short lived, and are negligible.

The above description, and the disclosure of FIG. 4, provide structural constraints upon control network 25 of FIG. 1. This network must be constructed and arranged to supply FIG. 4's delta energization to motors 11 and 14. The specific structure selected to implement the control order of FIG. 4 is capable of many variations, as known to those of skill in the art.

The unbuffered length of tape moving between the two reels, FIG. 1, is of a known mass for a given transport mechanism. If it is desired to increase the speed of this length of tape without changing its tension, the two motors are controlled by network 25 so as to uniformly accelerate both ends of this length of tape to the new speed. If it is desired to maintain the speed at its present value, but to increase the tape tension, the speed of the two ends of this length of tape are differentially controlled.

For example, if the length of unbuffered tape 12 running between reels 10 and 13 is moving at the proper speed, but the tape tension is too low, motor 14 is energized to momentarily increase the speed of the lower end of this length of tape. This momentary period, during which the lower end of the length of tape is running at a higher speed than is the upper end, causes the tape tension to increase. Thereafter, the lower end of the tape length is decelerated to the desired speed, to thereby cause the tape tension to change without changing the tape speed which exists before and after the momentary interval during which tension is adjusted.

The exact algorithm to be solved by control network 25 is not disclosed since this algorithm can take many forms, depending upon the characteristics of motors 11 and 14, the characteristics of supply reel 11 and takeup reel 13, and the details of the tape support and guidance mechanism which may be utilized to guide the length of unbuffered tape 12 which extends between the two reels. Whatever the form of the algorithm, it will, in accordance with the present invention, follow the general constraints imposed by the disclosure of FIG. 4.

Figure 6:
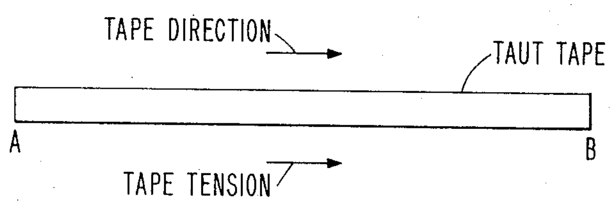
FIG. 6 is a showing of a taut section of tape, having ends A and B, traveling through space in a direction from left to right.

FIG. 6 shows a taut section of tape, such as the section running between reels 10 and 13 of FIG. 3, having ends A and B moving in the direction identified by the arrow labeled tape direction, and having a tension parameter identified by the arrow labeled tape tension.

Figure 7:
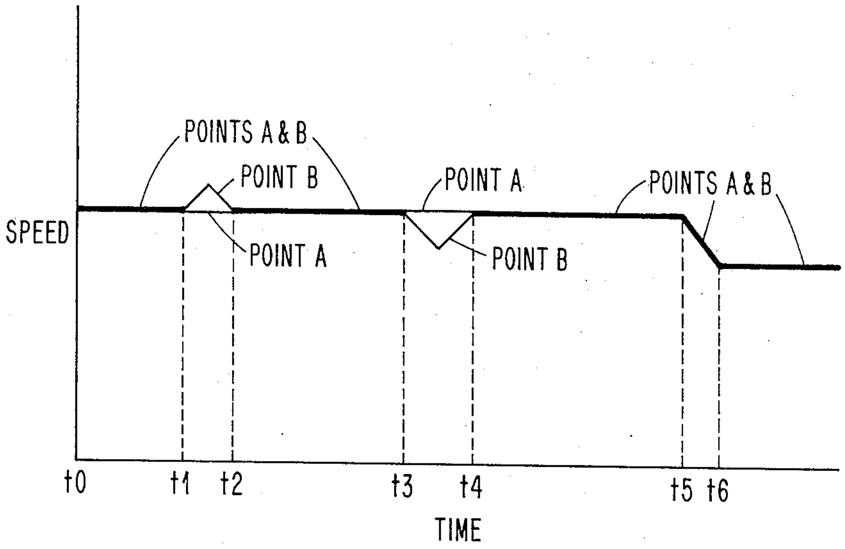
FIG. 7 is a graph which plots the speed of FIG. 6's tape section as a function of time, and is useful in understanding the manner in which the speed and/or tension in the tape section is adjusted and controlled.

FIG. 7 is a graphical representation of the speed of the two tape ends, identified as points A and B, as this tape mass travels through space, speed being plotted as a function of time.

At time $t\mathbf{0}$, the tape is as depicted in FIG. 7. It possesses a motion parameter such that points A and B are moving at the same speed, and the degree of being stretched to stiffness, i.e., tension of the taut tape is represented by the tape tension arrow, FIG. 6.

Three examples will now be described. Example A will discuss increasing tape tension with no speed change; that is, the tape speed after the period of tension adjustment is equal to the tape speed before the period of adjustment; Example B will discuss decreasing tape tension with no speed change; and Example C will discuss decreasing speed with no tape tension change.

Example A, increasing tape tension with no speed change, occurs during time period $t\mathbf{1}$-to-$t\mathbf{2}$. During time period $t\mathbf{1}$-to-$t\mathbf{2}$ the speed of the left-hand end of the tape section, point A, remains unchanged. However, the speed of the right-hand end, point B, first increases and then decreases, such that at the instantaneous times $t\mathbf{1}$ and $t\mathbf{2}$ the speed of point B is equal to the speed of point A, whereas for all times between times $t\mathbf{1}$ and $t\mathbf{2}$, the speed of point B is higher than the speed of point A. This incremental acceleration of point B increases the tape tension which exists in period $t\mathbf{2}$-to-$t\mathbf{3}$. In addition, this increase in tape tension has occurred with no increase in the speed of the mass of tape, as the speed during period $t\mathbf{2}$-to-$t\mathbf{3}$ is compared to the speed during period $t\mathbf{0}$-to-$t\mathbf{1}$.

Example B, decreasing tape tension with no speed change, occurs in the period $t\mathbf{3}$-to-$t\mathbf{4}$. Here again, the speed of the tape's point A remains unchanged during the time interval $t\mathbf{3}$-to-$t\mathbf{4}$. However, the speed of the tape's point B first decreases and then increases such that while the instantaneous speed at times $t\mathbf{3}$ and $t\mathbf{4}$ is equal to the speed of point A, the instantaneous speed of point B at all times between times $t\mathbf{3}$ and $t\mathbf{4}$ is less than the speed of point A. As a result of this momentary acceleration of point B, the tape tension in the tape mass A-B decreases. In other words, the tape tension which exists in the period $t\mathbf{4}$-to-$t\mathbf{5}$ is less than the tape tension which exited in both periods $t\mathbf{0}$-to-$t\mathbf{1}$ and $t\mathbf{2}$-to-$t\mathbf{3}$. Sinc the speed of both ends of the mass of tape is equal in the periods $t\mathbf{0}$-to-$t\mathbf{1}$, $t\mathbf{2}$-to-$t\mathbf{3}$ and $t\mathbf{4}$-to-$t\mathbf{5}$, tape tension has been changed with no attendant change in the speed of tape mass A-B, disregarding of course the short adjustment periods $t\mathbf{1}$-to-$t\mathbf{2}$ and $t\mathbf{3}$-to-$t\mathbf{4}$. The tension, i.e., the degree with which the tape is stretched to a condition of extension or tautness, has been changed by momentary differential acceleration of the two ends A and B of the tape's mass during the periods $t\mathbf{1}$-to-$t\mathbf{2}$ and $t\mathbf{3}$-to-$t\mathbf{4}$.

Example C, decreasing tape speed with no change in tape tension, occurs during the period $t\mathbf{5}$-to-$t\mathbf{6}$. As FIG. 7 shows, the speed of points A and B are at all times equal after time $t\mathbf{4}$. However, at time $t\mathbf{5}$ both points A and B experience uniform deceleration such that the speed of points A and B uniformly decrease until time $t\mathbf{6}$. At time $t\mathbf{6}$ the period of deceleration ends and tape mass A-B now moves at a new lower speed. Since points A and B have not experienced differential acceleration, tape tension has not changed, i.e., the degree with which the tape is stretched to a condition of stiffness has not been changed.

Clearly the speed of point A can be controlled in an analogous fashion. In practice it may be desirable to control both A and B, using the appropriate control law for the system.

Figure 2:
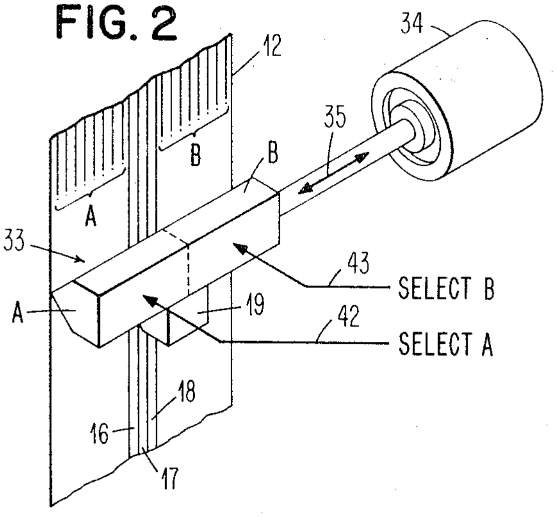
FIG. 2 is a showing of a modified form of the web transport of FIG. 1, this embodiment having a generally stationary data processing head which carries the control head as an integral part thereof.

As a further feature of the present invention, a data processing head 32 of FIG. 1 or a data processing head 33 of FIG. 2 selectively cooperates with one of the groups of digital data tracks A and B, the lateral position of the data processing head being controlled by head actuator 34. Actuator 34 is a linear actuator which is adapted to bidirectionally move the data processing head, as shown by motion arrow 35.

Referring to FIG. 1, data processing head 32 includes a single multiple-head-gap group which is adapted to selectively cooperate with one of the plurality of groups of data tracks A and B, the particular data track being selected by command inputs 36 and 37 to control network 48. Control network 38 provides an output on conductor 39 to control motor driver 40 in a manner to laterally position head 32 relative to the selected one of the data track groups A or B. Transducer 19 responds to prerecorded reference tracks 15, and particularly to the lateral position of the tape relative to transducer 19, to detect the position of the individual tracks 16, 17 and 18 relative to the fixed position of transducer 19 and to provide an actual-lateral-tape-position signal on conductor 41 to an input of control network 38. this signal is manipulated or interpreted to indicate the lateral position of the tape at the critical location of head 32. Should the length of unbuffered tape 12 experience undesired lateral movement, the tape-position signal on conductor 41 is effective, through control network 38, to provide fine positioning of data processing head 32 to position its individual head gaps in exact alignment with the individual tracks of the selected one of the two data track groups A and B. In the exemplary showing of FIG. 1, each of these data track groups is shown as having seven tracks, thus head 32 would have been individual head gaps.

Referring to FIG. 2, this figure discloses a modified form of the web transport of FIG. 1, and specifically an embodiment having a generally stationary data processing head 33 which carries as an integral part thereof the control transducer means 19. Head 33 includes two individual multiple-gap data processing heads which have also been identified by the legends A and B, corresponding to the cooperatively associated data track groups A and B. In this embodiment, one of the heads A or B is selected by an input on conductors 42 or 43, respectively. Here again, transducer means 19 provides the three signals discussed in connection with conductors 21, 22 and 41 of FIG. 1. Should the length of unbuffered tape 12 experience undesired lateral movement, this movement is detected by transducer means 19 and head actuator 34 is controlled to move head 33 and transducer means 19 an amount to reposition transducer 19 and thus heads A and B into exact coincidence with data track groups A and B carried by tape 12. As has been mentioned, the structure of FIG. 2 provides a preferred arrangement where the control transducer means is mounted immediately adjacent the critical head-to-tape interface of the data processing head.

While the invention has been particularly shown and described with reference to preferred embodiments thereof, it will be understood by those skilled in the art that various changes in form and details may be made therein without departing from the spirit and scope of the invention.

What is claimed is:

1. A reel-to-reel web transport, comprising:

a supply reel and a motor for driving said supply reel, a take-up reel and a motor for driving said take-up reel, a length of unbuffered tape extending between said reels, a data processing station adjacent said length of unbuffered tape to define a tape interface, control transducer means cooperating with said length of unbuffered tape providing actual-tape-speed and actual-tape-tension signals indicative of the tape speed and tension at said interface, comparison means responsive to the two output signals and to desired-tape-speed and desired-tape-tension signals and effective to compare said signals and to originate speed and tension error signals, and control means responsive to the two error signals and connected to jointly control the energization of said supply reel motor and take-up reel motor in accordance with both error signals to maintain desired tape speed and tape tension at said interface by the implementation of a four-quadrant cartesian coordinate tape speed versus tape tension control order for said motors such that delta energization of said take-up motor minus and plus the delta energization of said supply motor is in both cases less than zero when the tape is overspeed and the tension is high;

such that the delta energization of said take-up motor minus and plus the delta energization of said supply motor is in both cases greater than zero when the tape is underspeed and the tension is low;

such that the delta energization of said take-up motor minus and plus the delta energization of said supply motor is less than zero and greater than zero, respectively, when the tape is underspeed and the tension is high; and such that the delta energization of said take-up motor minus and plus the delta energization of said supply motor is greater than zero and less than zero, respectively, when the tape is overspeed and the tension is low.

2. A reel-to-reel web transport as defined in claim 1, wherein said length of unbuffered tape includes a prerecorded reference track of known linear characteristic, and wherein said control transducer means includes a magnetic transducer responsive to said prerecorded track to provide said actual-tape-speed signal.

3. A reel-to-reel web transport as defined in claim 2, wherein said control transducer means includes a force transducer to provide said actual-tape-tension signal.

4. A web transport as defined in claim 3 wherein said tape includes a plurality of laterally positioned groups of data tracks, and said magnetic transducer provides an actual-lateral-tape-position signal; and including a data processing head adapted to selectively operate with one of said groups of data tracks, a head actuator connected to said head control the lateral position thereof, and means responsive to said tape-position signal and effective to control said head actuator to laterally position said head relative to said data tracks.

5. A web transport as defined in claim 4 wherein said data processing head includes a plurality of head groups, each one of which corresponds to one of said plurality of groups of data tracks, and means mounting said control transducer means for lateral movement with said data processing head.

6. A web transport as defined in claim 5 including means adapted to select one of said plurality of head groups as an operative head group.

7. A web transport as defined in claim 4 wherein said data processing head includes a single head group adapted to selectively correspond to one of said plurality of groups of data tracks, means mounting said control transducer means at a fixed lateral position, means movably mounting said data processing head for lateral indexing movement across said tape, and means operable to select one of said plurality of groups of data tracks as an operative track and to laterally move said data processing head into position coincident therewith.

* * * * *